United States Patent
Schmidhauser et al.

(10) Patent No.: US 11,133,562 B2
(45) Date of Patent: Sep. 28, 2021

(54) INTEGRATED ELECTRODE SEPARATOR ASSEMBLIES FOR LITHIUM ION BATTERIES

(71) Applicant: Arkema Inc., King of Prussia, PA (US)

(72) Inventors: John Schmidhauser, Paoli, PA (US); Scott R. Gaboury, Blue Bell, PA (US); Ramin Amin-Sanayei, Malvern, PA (US); Christophe Roger, Ithaca, NY (US); Wensheng He, Wayne, PA (US); Rosemary Heinze, Haddonfield, NJ (US)

(73) Assignee: Arkema Inc., King of Prussia, PA (US)

( * ) Notice: Subject to any disclaimer, the term of this patent is extended or adjusted under 35 U.S.C. 154(b) by 153 days.

(21) Appl. No.: 14/410,674

(22) PCT Filed: Nov. 1, 2013

(86) PCT No.: PCT/US2013/067991
§ 371 (c)(1),
(2) Date: Dec. 23, 2014

(87) PCT Pub. No.: WO2014/071144
PCT Pub. Date: May 8, 2014

(65) Prior Publication Data
US 2015/0340676 A1    Nov. 26, 2015

Related U.S. Application Data

(60) Provisional application No. 61/721,593, filed on Nov. 2, 2012.

(51) Int. Cl.
| | | |
|---|---|---|
| *H01M 50/46* | (2021.01) | |
| *H01G 11/52* | (2013.01) | |
| *H01M 50/403* | (2021.01) | |
| *H01M 50/411* | (2021.01) | |
| *H01M 50/449* | (2021.01) | |
| *H01M 50/446* | (2021.01) | |

(52) U.S. Cl.
CPC ............ *H01M 50/46* (2021.01); *H01G 11/52* (2013.01); *H01M 50/403* (2021.01); *H01M 50/411* (2021.01); *H01M 50/449* (2021.01); *H01M 50/446* (2021.01); *Y02E 60/13* (2013.01)

(58) Field of Classification Search
CPC .. H01M 2/1673; H01M 50/46; H01M 50/403; H01M 50/449; H01M 50/411; H01G 11/52
See application file for complete search history.

(56) References Cited

U.S. PATENT DOCUMENTS

| | | | |
|---|---|---|---|
| 7,097,673 B2 | 8/2006 | Dudley et al. | |
| 7,662,517 B2 | 2/2010 | Lee et al. | |
| 8,147,732 B2 | 4/2012 | Beard | |
| 2002/0168569 A1 | 11/2002 | Barriere et al. | |
| 2010/0159314 A1 | 6/2010 | Kim et al. | |
| 2010/0261065 A1* | 10/2010 | Babinec | H01M 2/166 429/246 |
| 2010/0304270 A1* | 12/2010 | Amin-Sanayei | H01M 4/0404 429/483 |
| 2010/0330268 A1 | 12/2010 | Jiang | |
| 2011/0136010 A1* | 6/2011 | Muraoka | H01M 4/13 429/217 |
| 2011/0217585 A1* | 9/2011 | Wang | B32B 37/02 429/145 |
| 2012/0015246 A1 | 1/2012 | Amin-Sanayei et al. | |
| 2012/0082884 A1* | 4/2012 | Orilall | H01M 2/162 429/145 |
| 2012/0231321 A1 | 9/2012 | Huang et al. | |
| 2015/0020947 A1* | 1/2015 | Stanga | H01M 2/145 156/60 |

FOREIGN PATENT DOCUMENTS

| | | |
|---|---|---|
| JP | 2001085061 A | 3/2001 |
| JP | 2001093513 A | 4/2001 |
| JP | 2003086252 | 9/2001 |
| JP | 2003086252 | 3/2003 |
| JP | 2011-171290 A | 9/2011 |
| JP | 2012-033312 A | 2/2012 |
| WO | WO 2013/126490 | 8/2013 |
| WO | WO-2013120858 A1 * | 8/2013 |

* cited by examiner

*Primary Examiner* — Nathanael T Zemui
(74) *Attorney, Agent, or Firm* — Joanne Rossi

(57) ABSTRACT

The invention relates to integrated electrode separators (IES), and their use in lithium ion batteries as replacements for free standing separators. The IES results from coating an electrode with a fluoropolymer aqueous-based emulsion or suspension, and drying the coating to produce a tough, porous separator layer on the electrodes. The aqueous fluoropolymer coating may optionally contain dispersed inorganic particles and other additives to improve electrode performance such as higher ionic conduction or higher temperature use. The IES provides several advantages, including a thinner, more uniform separator layer, and the elimination of a separate battery component (separator membrane) for a simpler and cost-saving manufacturing process. The aqueous separator coating can be used in combination with a solvent cast electrode as well as an aqueous cast electrode either in two separate process steps, or in a one-step process.

9 Claims, No Drawings

INTEGRATED ELECTRODE SEPARATOR ASSEMBLIES FOR LITHIUM ION BATTERIES

This application claims benefit, under U.S.C. § 119 or § 365 of PCT Application Number PCT/US2013/067991, filed Nov. 1, 2013; and U.S. Provisional Application No. 61/721,593, filed Nov. 2, 2012, said applications incorporated herein by reference.

FIELD OF THE INVENTION

The invention relates to integrated electrode separators (IES), and their use in lithium ion batteries as replacements for free standing membrane separators. The IES results from coating an electrode with a fluoropolymer aqueous-based emulsion or suspension, and drying the coating to produce a tough, porous separator layer on the electrodes. The aqueous fluoropolymer coating may optionally contain dispersed inorganic particles and other additives to improve electrode performance such as higher use temperature or higher ionic conductivity. The IES provides several advantages, including a thinner, more uniform separator layer, and the elimination of a separate battery component (separator membrane) for a simpler and cost-saving manufacturing process. The aqueous separator coating can be used in combination with a solvent cast electrode as well as an aqueous cast electrode either in two separate process steps, or in a one-step process.

BACKGROUND OF THE INVENTION

Lithium batteries, including lithium metal batteries, lithium ion batteries, lithium polymer batteries, and lithium ion polymer batteries are finding increased usage due to drive voltages and higher energy densities than those of conventional batteries using aqueous electrolytes (such as Ni-MH batteries).

Lithium ion batteries and lithium ion polymer batteries consist of a cathode stack, an anode stack, and a separator in between the anode and cathode. The function of the battery separator is to prevent electrical contact between the positive and negative electrodes while at the same time allowing rapid transport of ionic charge carriers that are needed to complete the circuit for the passage of current. The most common type of separator used in lithium ion batteries is microporous polyolefin membrane. Unfortunately, polyolefin membrane separators have several drawbacks. They are not wettable by conventional electrolytes used in battery, resulting in islands on the separator, which are not properly wetted. A greater drawback is the shrinkage or melting of polyolefin separators caused when battery temperatures approach the softening point of those polyolefin materials (about 130° C. or less), creating the possibility of short-circuits inside the battery that can result in fire and explosion. Finally, the freestanding separator in conventional cell constructions is the second greatest percent cost contributor for cell materials, at 14% of cell cost, (Ref: Takeshita, H, LIB-related Study Program 08-09.

An excellent alternative to polyolefins for separators is polyvinylidene fluoride (PVDF), which has wetting and high temperature resistance properties that surpass those of polyolefins. U.S. Pat. No. 7,662,517 describes coating a PVDF/inorganic material layer onto a polyolefin separator to improve dimensional stability at elevated temperatures, wettability, and flexibility. Although these new separators are more resilient, it is not possible to prevent separator shrinkage at elevated temperature since a polyolefin-based separator, is still present as a substrate.

Microporous membranes have been fabricated from PVDF resin, as described in U.S. Pat. No. 8,147,732. However, the porosity of these PVDF membranes is low compared to polyolefins and the cost is high, especially since fabrications of thin, defect-free membranes has proven to be difficult, requiring the use of thicker membranes with higher materials costs.

It is desirable to find an alternative to existing freestanding separators that also maintain or improve the safety and performance of current designs.

US 20100330268 describes producing separators for lithium ion batteries by coating electrodes with silica gel particles dispersed in a polymeric matrix (such as PVDF). This process uses organic solvent to form a polymer solution for coating the electrodes. These solution coatings dry to a non-porous layer. The current is transported through the silica domains, which may or may not form a continuous network. Also, formation of the electrode layer and the separator layer must be carried out in separate steps.

US 2011/0217585 describes an integrated composite separator in which a ceramic polymer slurry is directly sprayed or coated onto an electrode. The ceramic layers on each electrode are separated by a polymer layer that can be a polyvinylidene fluoride homopolymer or copolymer. The polymer is dissolved in an organic solvent, and the solution would form a solid, non-porous film; and therefore the polymer solution must be applied either as spun fibers or coated lines to provide spaces between the polymer for the passage of electrolyte and Li ions. Aqueous polymer dispersions are not mentioned.

Aqueous fluoropolymer dispersions for use in lithium ion battery electrode coatings are described in US patent applications 20100304270, and 20120015246 to Arkema Inc., and aqueous fluoropolymer dispersions for sepatators are described in U.S. 61/601,278. Unlike polymer solvent solutions, the aqueous coatings contain polymer particles that can be dried to adhere at the contact points, forming a porous, continuous, web-like membrane rather than a continuous film.

It has now been found that intergrated electrode separator assemblies can be produced by coating fluoropolymer aqueous dispersions directly onto electrode stacks, then drying the coated electrodes to produce a porous fluoropolymer separator membrane adhered to the exterior of the electrode. These fluoropolymer integrated electrode separator assemblies provide several advantages, including (1) reducing the cost associated with the separator by 60-65% or more by using waterborne fluoropolymers slurries as replacements for free-standing polymeric membranes, (2) eliminating the use of hazardous solvents in electrode slurries through the use of waterborne fluoropolymers, (3) simplifying the manufacturing process by utilizing integrated electrode separator (IES) construction and (4) improves the performance and safety of the batteries compared to those manufactured using existing technology.

SUMMARY OF THE INVENTION

The invention relates to an integrated electrode separator assembly comprising at least one electrode having directly adhered hereto a porous fluoropolymer separator layer comprising interconnected fluoropolymer particles.

The invention also relates to integrated electrode separator assembly as part of a battery, capacitor, electric double layer capacitor, membrane electrode assembly or fuel cell.

The invention further relates to a process for forming an integrated electrode separator assembly comprising the steps of:

a) forming separately electrodes comprising a cathode assembly and an anode assembly;
b) forming an aqueous fluoropolymer separator dispersion;
c) coating said aqueous fluoropolymer separator dispersion onto at least one electrode; and
d) drying said coated electrode, to form an integrated electrode separator.

In one embodiment of the invention, steps a), c) and d) are combined into a single operation wherein an electroconductive material is first coated with preferably an aqueous fluoropolymer electrode composition, although solvent cast electrode will work as well, dried, then coated with said aqueous fluoropolymer separator dispersion, then dried to form an integrated electrode separator.

In second embodiment of the invention steps a), c) and d) are combined into a single operation wherein a slurry of electroconductive material and aqueous fluoropolymer separator dispersion are simultaneously cast on to current collector and dried to form integrated electrode Separator assembly.

DETAILED DESCRIPTION OF THE INVENTION

Percentages, as used herein are weight percentages, unless noted otherwise, and molecular weights are weight average molecular weights, unless other wise stated.

All references cited are incorporated herein by reference.

The aqueous fluoropolymer dispersion or emulsion of the present invention forms a tough, thin, porous network on one or more electrodes—serving the function of a pre-made separator film or membrane found in typical lithium ion batteries.

The aqueous fluoropolymer dispersion consists of fluoropolymer particles dispersed in an aqueous media. The fluoropolymer particles have an average particle size of less than 500 nm, preferably less than 400 nm, and more preferably less than 300 nm. Small particle size (<200 nm diameter) may have advantages as far as stability and non-settling of the coating mixture.

The fluoropolymer particles may be homogeneous in composition, or may be formed in a known manner to vary within the particle—such as in a core-shell structure. A heterogeneous structure may be used to create particles that can more easily transform from the aqueous dispersion to the final porous separator layer.

The manner of practicing the invention will be generally described with respect to a specific embodiment thereof, namely polyvinylidene fluoride (PVDF) based polymer prepared in aqueous emulsion polymerization using non-fluorinated emulsifier as the principle emulsifier. Although the process of the invention has been generally illustrated with respect to PVDF based polymers, one of skill in the art will recognize that analogous polymerization techniques can be applied to the preparation of homopolymers and copolymers of other fluorinated monomers and their formulation for the coating of separators in general, and more specifically to copolymers of vinylidene fluoride (VDF), tetrafluoroethylene (TFE), and/or chlorotrifluoroethylene (CTFE)—with co-reactive monomers (fluorinated or non-fluorinated) such as hexafluoropropylene (HFP), perfluorovinyl ether, vinyl acetate, acrylates, methacrylates, and the like. While non-fluorinated surfactants are preferred, the use of fluorosurfactants is also anticipated by this invention.

The term "vinylidene fluoride polymer" (PVDF) used herein includes normally high molecular weight homopolymers, copolymers, and terpolymers within its meaning. Copolymers of PVDF are particularly preferred, as they are softer—having a lower Tm and a reduced crystalline structure. Such copolymers include those containing at least 50 mole percent, preferably at least 70 mole percent, preferably at least 75 mole %, more preferably at least 80 mole %, and even more preferably at least 85 mole % of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride. Particularly preferred are copolymers composed of from at least about 70 and up to 90 mole percent vinylidene fluoride, and correspondingly from 10 to 30 mole percent hexafluoropropene. Terpolymers of vinylidene fluoride, hexafluoropropene and tetrafluoroethylene are also representatives of the class of vinylidene fluoride copolymers, embodied herein.

The PVDF for use in the separator coating composition preferably has a high molecular weight. By high molecular weight, as used herein, is meant PVDF having a melt viscosity of greater than 1.0 kilopoise according to ASTM method D-3835 measured at 450° F. and 100 sec$^{-1}$.

The PVDF used in the invention is generally prepared by polymerizing means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride and one or more comonomers is fed into the reactor. Once the initial charge of monomers are introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 110° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably, for regulatory reasons, the PVDF emulsion of the invention is made and processed without any fluorinated surfactants (is fluorosurfactant-free). Non-fluorinated surfactants useful in the PVDF polymerization could be both ionic and non-ionic in nature including, but are not limited to, 3-allyloxy-2-hydroxy-1-propane sulfonic acid salts, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent.

In the present invention, PVDF polymer particles are generally present in the coating composition, however a blend of several different polymer binders, preferably all fluoropolymer binders, and most preferably all PVDF binders may also be used. In one embodiment, only thermoplastic fluoropolymers that can be softened by fugitive adhesion promoters are used.

There are several advantages of using a fluoropolymer dispersion or emulsion over solvent-based fluoropolymer solutions in the present invention (PVDF preferred and used as an exemplary fluoropolymer). These include performance, manufacturing and environmental advantages, including, but not limited to:
  a) Aqueous PVDF-based compositions are safer to use and process, less hazardous to health, and more environmentally friendly than solvent-based PVDF compositions.
  b) Aqueous PVDF dispersions were advantageously synthesized using non-fluorinated surfactant.
  c) Aqueous PVDF dispersions can be used as synthesized, without the need for isolating and drying to a powder-saving time and energy.
  d) Water has a lower boiling point than typically used organic solvents, so the coating can be dried at a lower temperature, or a shorter period of time, if desired.
  e) Aqueous PVDF dispersions contain PVDF particles that can be softened to adhere to additive particles and the electrodes, by using fugitive adhesion promoters—resulting in a separator layer on the electrode upon drying.
  f) The PVDF-based copolymers have advantageously low melting temperature or low to zero crystalline content so that can have lower film forming temperature and/or require less fugitive solvents.

The aqueous fluoropolymer emulsion can be used as produced to form a separator coating, or can be used as part of an aqueous slurry of the polymer particles and other additives, with the polymer particles serving as a binder and forming a continuous, web-like structure within the dried separator layer. A minor amount of one or more other water-miscible solvents, such as ethylene glycol, may be mixed into the PVDF latex to improve freeze-thaw stability.

Additives can be blended into the aqueous fluoropolymer dispersion help form an optimal number and distribution of microvoids to control porosity. Additives can also help control the rate by which the fluoropolymer particles join together to form the continuous separator structure; influence the properties of the separator layer, such as the dimensional stability and toughness by promoting a stronger adhesion between the fluoropolymer particles (adhesion promoters); and help to maintain the physical shape of the separator.

Inorganic materials such as nano-clays, fumed silica, fumed alumina, and nano-size metal oxides and related inorganic additives are compatible with waterbased formulations and can be used as part of separator coatings in this invention. These inorganic materials are added to the aqueous fluoropolymer as powders, to form an aqueous fluoropolymer slurry. These optional inorganic materials can be judiciously chosen based on slurry stability, ease of application, cost, effect of on long-term battery performance, and most importantly, dimensional stability of the composite at high temperature.

The inorganic materials are characterized in that their physical properties are not changed even at a high temperature of 200° C. or higher, the separator coating layer using the inorganic particles can have excellent heat resistance.

The inorganic powdery materials, must be electrochemically stable (not subjected to oxidation and/or reduction at the range of drive voltages). Moreover, the inorganic materials preferably have a high ion conductivity. Inorganic powdery materials of low density are preferred over higher density materials, as the weight of the battery produced can be reduced. The dielectric constant is preferably 5 or greater. Useful inorganic powdery materials in the invention include, but are not limited to $BaTiO_3$, $Pb(Zr,Ti)O_3$, $Pb_{1-x}La_xZr_yO_3$ ($0<x<1$, $0<y<1$), $PBMg_3Nb_{2/3})_3$, $PbTiO_3$, hafnia (HfO ($HfO_2$), $SrTiO_3$, $SnO_2$, $CeO_2$, MgO, NiO, CaO, ZnO, $Y_2O_3$, $Al_2O_3$, $TiO_2$, SiC, $ZrO_2$, boron silicate, $BaSO_4$, nano-clays, fumed silica, fumed alumina, or mixtures thereof.

The separator layer of the invention can form pores having a size of several micrometers by controlling the size of the powdery inorganic materials, content of inorganic materials and the mixing ratio of inorganic materials and binder polymer.

The powdery inorganic materials preferably have a size of 0.001-10 microns. When the size is less than 0.001 micron the inorganic particles have poor dispersibility. When the size is greater than 10 micron the coating has an increased thickness under the same solid content, resulting in degradation in mechanical properties. Furthermore, such excessively large pores may increase a possibility of internal short circuit being generated during repeated charge/discharge cycles. The powdery inorganic materials can be present in the fluoropolymer slurry at 0 to 99 weight percent, preferably 30-95 weight percent, and more preferably from 50 to 90 weight percent, based on the total of polymer solids and powdery inorganic material. When the content of the powdery inorganic materials is greater than 99 weight percent, the polymer content is too low to provide sufficient adhesion among the inorganic materials, resulting in degradation in mechanical properties of a finally formed separator.

In one embodiment, the fluoropolymer separator coatings on the anode and cathode are different, with one layer being fluoropolymer-rich (greater than 50 weight percent fluoropolymer and preferably greater than 75 weight percent polymer) to prevent electrical contact between electrodes and improving ionic conductivity; the other layer could be inorganic material-rich (greater than 50 weight percent inorganic material and preferably greater than 75 weight percent inorganic material) to provide high temperature dimensional stability through the incorporation of nano-size inorganic additives. Consequently, there could be two slurry formulations to optimize: one fluoropolymer-rich and the other inorganic-rich. For example, the coating with a fluoropolymer-rich layer will provide flexibility, impact resistance, and high swelling with electrolyte at elevated temperatures to mitigate hot spots. The inorganic—rich coating will introduce dimensional stability and act as ceramic-type insulating layer at elevated temperature, i.e. >150° C. to prevent catastrophic failure. The robustness of the separator layer will be determined by measuring thickness, mechanical integrity, and swelling by electrolyte at room and elevated temperatures.

In one embodiment, only one of the electrodes (either anode or cathode) has an integrated separator layer that serves as the only barrier between the anode and cathode elements, with the other electrode being uncoated.

In another embodiment, both anode and cathode electrodes have integrated separator coating that serve as the barrier between the anode and cathode elements, providing higher safety value.

One safety advantage of the invention is that it can mitigate hot spot formation in the battery by regulating electrolyte distribution. At higher temperature the IES coating will swell with electrolyte, creating a larger separation between electrodes, depriving electrodes of electrolyte at the hot spot. As a result, the local ion transfer will be decreased, quenching the hot spot. When the hot spot cools, the separator layer releases electrolyte and returns to its original dimensions, resuming normal operation.

One or more other additives, known in the art, may be added at low effective levels to enhance certain properties of the aqueous fluoropolymer slurry, processing, or the final separator coating. These include, but are not limited to, surfactants, settling agents, wetting agents, thickeners, rheology modifiers, fugitive adhesion promoters, fillers, leveling agents, anti-foaming agents, pH buffers, and other adjutants typically used in waterborne formulation while meeting desired electrode requirements.

Surfactants and/or anti-settling agents may be added to the fluoropolymer composition at 0 to 10 parts, preferably from 0.1 to 10 parts, and more preferably 0.5 to 5 parts per 100 parts of water. These anti-settling agents or surfactants are added to the fluoropolymer dispersion post-polymerization, generally to improve the shelf stability, and provide additional stabilization during slurry preparation. Some surfactant/anti-settling agent is also present in the composition remaining from the polymerization process. Useful anti-settling agents include, but are not limited to, ionic substances, such as salts of alkyl sulfates, sulfonates, phosphates, phophonates (such as sodium lauryl sulfate and ammonium lauryl sulfate) and salts of partially fluorinated alkyl sulfates, carboxylates, phosphates, phosphonates (such as those sold under the CAPSTONE brandname by DuPont), and non-ionic surfactants such as the TRITON X series (from Dow) and PLURONIC series (from BASF). In one embodiment, only anionic surfactants are used. It is preferred that no fluorinated surfactants are present in the composition, either residual surfactant from the polymerization process, or added post-polymerization in forming or concentrating an aqueous dispersion.

Wetting agents may be incorporated into the composition at from 0 to 5 parts, and preferably from 0 to 3 parts per 100 parts of water. Surfactants can serve as wetting agents, but wetting agents may also include non-surfactants. In some embodiments, the wetting agent can be an organic solvent. The presence of optional wetting agents permits uniform dispersion of powdery inorganic material(s) into aqueous dispersion of vinylidene fluoride polymer. Useful wetting agents include, but are not limited to, ionic and non-ionic surfactants such as the TRITON series (from Dow), BYK series (from ALTANA) and the PLURONIC series (from BASF), and organic liquids that are compatible with the aqueous dispersion, including but not limited to NMP, DMSO, and acetone.

Thickeners and rheology modifiers may be present in the fluoropolymer separator composition at from 0 to 10 parts, preferably from 0 to 5 parts per 100 parts of water. The addition of water-soluble thickener or rheology modifier to the above dispersion prevents or slows down the settling of inorganic powdery materials while providing appropriate slurry viscosity for a coating process. Useful thickeners include, but are not limited to the ACRYSOL series (from Dow Chemical); fumed silica and/or fumed alumina; partially neutralized poly(acrylic acid) or poly(methacrylic acid) such as CARBOPOL from Lubrizol; and carboxylated alkyl cellulose, such as carboxylated methyl cellulose (CMC). Adjustment of the formulation pH can improve the effectiveness of some of the thickeners. In addition to organic rheology modifiers, inorganic rheology modifiers can also be used alone or in combination. Useful inorganic rheology modifiers include, but are not limited to, inorganic rheology modifiers including but not limited to natural clays such as montmorillonite and bentonite, manmade clays such as laponite, and others such as silica, and talc.

An optional fugitive adhesion promoter helps to produce the interconnectivity needed in coatings formed from the composition of the invention. By "fugitive adhesion promoter" as used herein is meant an agent that increases the interconnectivity of the composition after coating. The fugitive adhesion promoter is then capable of being removed from the formed substrate generally by evaporation (for a chemical) or by dissipation (for added energy).

The fugitive adhesion promoter can be a chemical material, an energy source combined with pressure, or a combination, used at an effective amount to cause interconnectivity of the components of the aqueous composition during formation of the electrode. For chemical fugitive adhesion promoters, the composition contains 0 to 150 parts, preferably 1 to 100 parts, and more preferably from 2 to 30 parts, of one or more fugitive adhesion promoters per 100 parts of water. Preferably this is an organic liquid, that is soluble or miscible in water. This organic liquid acts as a plasticizer for fluoropolymer particles, making them tacky and capable of acting as discrete adhesion points during the drying step. The fluoropolymer particles are able to soften, flow and adhere to powdery materials during manufacture, resulting in electrodes with high connectivity that are non-reversible. In one embodiment the organic liquid is a latent solvent, which is a solvent that does not dissolve or substantially swell fluoropolymer resin at room temperature, but will solvate the fluoropolymer resin at elevated temperatures. In one embodiment a useful organic solvent is N-methyl-2-pyrrolidone. Other useful fugitive adhesion promoter agents include, but are not limited to, dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea.

In the case of energy as the fugitive adhesion promoter, useful energy sources include, but are not limited to, heat, IR radiation, and radio frequency (RF). For heat alone, the temperature during the processing of the PVDF composition on an electrode should be about 20 to 50° C. above the melting point of the polymer. When energy alone is used as the fugitive adhesion promoter, it is preferred that the heat is combined with pressure—such as a calendering step, for good interconnectivity.

The aqueous fluoropolymer separator coating composition of the invention can be obtained in many different ways.

In one embodiment, a polyvinylidene fluoride (PVDF) dispersion is formed (preferably without any fluorosurfactant). A predetermined amount of any anti-settling agent(s) or surfactant(s), is diluted in water and post-added to the PVDF dispersion latex with stirring, in order to provide adequate storage stability for the latex. To this PVDF dispersion/anti-settling mixture is added, with stirring, optional wetting agent(s), followed by adding any thickener(s), fugitive adhesion promoter(s), and then bringing the pH up to the appropriate range for the thickener to be effective, if necessary. Some thickeners such as CMC are effective in a wide range of pH, i.e. from 3 to 9 pH for CMC. The optional powdery inorganic material(s) and other ingredients are then added to the mixture with stirring. It may be advantageous to disperse the powdery inorganic material(s) in a fugitive adhesion promoter, the latent solvent or wetting agent to provide wetting of the powdery materials prior to admixing with the aqueous PVDF binder formulation. The final composition is then subjected to a high shear mixing to ensure uniform distribution of the powdery material in the composition. The final aqueous composition of the invention should have a viscosity useful for coating onto an electrode. The useful viscosity is in the range of from 1,000 to 20,000 cps at 20 rpm, and 25° C. depending on application methods.

The aqueous fluoropolymer separator coating composition is applied onto at least one electrode, by means known in the art, such as by brush, roller, ink jet, squeegee, foam applicator, curtain coating, vacuum coating, slot die coater, or spraying.

The electrodes of the invention are those known in the art. This includes preformed cathode and anode stacks made by known methods, such as 1) using a PTFE or PVDF binder in solvent solution to bind a powdery electrode material to an electroconductive substrate, and 2) the use of an aqueous composition having fluoropolymer particles and powdery electrode-forming materials to form a continuous, porous polymer network.

In a preferred embodiment, the aqueous fluoropolymer electrode material and the aqueous separator material are applied in a single operation—saving time and expense. No preformed electrode is needed, and no separator membrane is required. The integrated electrode separator assembly is made in a single process in which the electrode slurry (either solvent based or aqueous based) and the aqueous fluoropolymer composition of the invention are simultaneously applied onto an electroconductive substrate using a multi slot die coater and then dried to form the integrated electrode separator assembly.

The integrated separators of the invention can be used to form an electrochemical device, such as a battery, capacitor, electric double layer capacitor, membrane electrode assembly (MEA) or fuel cell, by means known in the art.

The IES of the invention has several advantages over the prior art, including but not limited to:

1. IES separators are less likely to have defects as compared to conventional freestanding separators because the layers are directly coated onto the electrodes. Handling of thin porous freestanding films often yields defects such as pinholes, gels, wrinkles, and contaminants, which are potential safety issues in LIB (short circuits). The process for producing separators with the new technology includes a high degree of control that ensures high quality. Because of the increased quality control and no need to handle the thin separator layer, 2. The production cost will be significantly less relative to untreated polyolefin-based separator.

3. Safety is improved by the use of an all-aqueous fluoropolymer system over polyolefin-based separator and organic solvent systems.

4. Internal resistance will be lower than that of polyolefin-based separators. The resistance to electrolyte flow/mobility through the pores of aqueous fluoropolymer will be lower because the separator layer is compatible with the electrolyte and is cast seamlessly onto the electrode. Freestanding separators have sharp boundaries, which could cause interruption and resistance to ionic mobility at the interfaces. In contrast, our proposed technology offers interconnectivity and continuity between electrodes and coated layers that should result in lowering impedance across the cell.

5. Wettability will increase as the electrolyte and waterborne fluoropolymers are both polar, in contrast to non-polar polyolefin separators.

6. Chemical/electrochemical stability will be much better than polyolefin because the in-situ separator is based on a PVDF-based resin, which has proven chemical and electrochemical stability.

7. Pore size will be tunable and have a pore volume equivalent or greater than that of the electrodes. The pore size and distribution are expected to be more uniform than those of freestanding separators since no stretching is needed.

8. Pinhole detection will be online for coated electrodes before assembly line. Interestingly, the rejection rate after cell assembly will decrease and cell safety will increase; undetected flaws in the separator coating on one electrode will be mitigated by the coating on the opposite electrode during cell lamination.

9. Dimensional stability will improve as little or no shrinkage is expected due to the integrated structure of the in-situ separator and electrodes. In addition, fluoropolymers do not have the temperature and shrinkage limitations exhibited by freestanding polyolefin separators, which could allow cells to be dried at higher temperatures leading to higher throughput.

10. Skew will not occur because there is no freestanding separator. Currently, when a strip of freestanding separator is laid out for lamination to electrodes, misalignment is often observed. Misalignment (skew) results in edge flaws and higher scrap generation.

11. Hot spot mitigation will be provided due to smart response: the in-situ separator is capable of mitigating hot spot formation in the cell by adapting to local temperatures at the electrode interfaces. The coated layer will swell at higher temperatures reducing effective ion transport and will go back to its original dimension when cooled.

12. Melt integrity will be superior to polyolefin-based separators because the melting temperature of the proposed waterborne fluoropolymers is higher. In addition, high melt viscosity resins that have minimal flow under normal forces, even above their melting temperature, could be selected.

EXAMPLES

General

The latexes of the invention are prepared by a typical process for making fluoropolymers using emulsifiers. The emulsifiers may be ionic or non-ionic, such as those containing blocks of polyethylene glycol, polypropylene glycol and/or polytetramethylene glycol. Preferably, no fluorinated or partially fluorinated surfactant is used in the process and none is then present in the fluoropolymer produced. The fluoropolymer dispersions produced have good latex stability and shelf-life, and are coagulum-free. These preferred dispersions are absolutely free of fluorinated or partially fluorinated surfactant—with no fluorinated surfactant being used in either the synthesis or in a post-addition.

In the polymerization process, the emulsifier may be added all upfront prior to polymerization, fed continuously during the polymerization, fed partly before and then during polymerization, or fed after polymerization started and progressed for a while.

Example 1

Into an 80-gallon stainless steel reactor was charged, 345 lbs of deionized water, 250 grams of PLURONIC 31R1 (non-fluorinated non-ionic surfactant from BASF), and 0.3 lbs of propane. Following evacuation, agitation was begun at 23 rpm and the reactor was heated. After reactor temperature reached the desired set point of 100° C., the VDF charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 70 pounds per hour. The VDF homopolymerization was continued until approximately 150 pounds VDF was introduced in the reaction mass. The VDF feed was stopped and the batch was allowed to react-out at the reaction temperature to consume residual monomer at decreasing pressure. After 25 minutes, the agitation was stopped and the reactor was cooled, vented and the latex recovered. Solids in the recovered latex were determined by gravimetric techniques and were about 27 weight % and a melt viscosity of about 27 kp according to ASTM method D-3835 was measured at 450° F. and 100 sec$^{-1}$. The melting temperature of the resin was measured in accordance with ASTM method D-3418 and was found to be about 162° C. The weight average particle size was measured by NICOMP laser light scattering instrument and was found to be about 150 nm.

Example 2

Into an 80-gallon stainless steel reactor was charged, 345 lbs of deionized water, 250 grams of PLURONIC 31R1 (non-fluorinated non-ionic surfactant from BASF), and 0.6 lbs of ethyl acetate. Following evacuation, agitation was begun at 23 rpm and the reactor was heated. After the reactor temperature reached the desired set point of 100° C., the VDF and HFP monomer were introduced to reactor with HFP ratio of 40 wt % of total monomers. Reactor pressure was then raised to 650 psi by charging approximately 35 lbs total monomers into the reactor. After the reactor pressure was stabilized, 5.0 lbs of initiator solution made of 1.0 wt % potassium persulfate and 1.0 wt % sodium acetate were added to the reactor to initiate polymerization. Upon initiation, the ratio of HFP to VDF was so adjusted to arrive at 16.5% HFP to total monomers in the feed. The rate of further addition of the initiator solution was also adjusted to obtain and maintain a final combined VDF and HFP polymerization rate of roughly 70 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 28 kp according to ASTM method D-3835 measured at 450° F. and 100 sec$^{-1}$. The melting temperature of resin was measured in accordance with ASTMD3418 and was found to be about 120° C. The weight average particle size was measured by NICOMP laser light scattering instrument and was found to be about 160 nm.

Example 3

Into an 80-gallon stainless steel reactor was charged, 345 lbs of deionized water, 250 grams of PLURONIC 31R1 (non-fluorinated non-ionic surfactant from BASF), and 0.35 lbs of ethyl acetate. Following evacuation, agitation was begun at 23 rpm and the reactor was heated. After reactor temperature reached the desired set point of 100° C., the VDF and HFP monomer were introduced to reactor with HFP ratio of 13.2 wt % of total monomers. Reactor pressure was then raised to 650 psi by charging approximately 35 lbs total monomers into the reactor. After reactor pressure was stabilized, 3.5 lbs of initiator solution made of 1.0 wt % potassium persulfate and 1.0 wt % sodium acetate were added to the reactor to initiate polymerization. Upon initiation, the ratio of HFP to VDF was so adjusted to arrive at 4.4% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 160 pounds monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 38 kp according to ASTM method D-3835 measured at 450° F. and 100 sec$^{-1}$. The melting temperature of resin was measured in accordance with ASTM method D-3418 and was found to be about 152° C. The weight average particle size was measured by NICOMP laser light scattering instrument and was found to be about 160 nm.

The above PVDF based latexes of example 1-3 were then formulated into an aqueous separator coating composition and applied to a separator and dried.

Examples 4-6

Three identical stock solutions were prepared comprising 2 g BYK-346 (from BYK-Chemie), 20 g of DI water, and 20 g of tri-ethyl-phosphate (TEP). These stock solutions were independently added to 80 g of latexes of examples 1-3 and called Example 4-6 respectively.

Example 7-9

In the second step, three identical stock solutions were prepared, comprised of 30 g of 1% aqueous solution of CARBAPOL 940 (from Lubrizol) in DI water and 6 g of 0.7% aqueous solution of LiOH (neutralizing agent) in DI water. These stock solutions were individually added to example 4-6 and called example 7-9 respectively to thicken the latex without coagulating it.

Example 10-12

1.5 g of AEROXIDE ALU C (Fumed-Alumina by EVONIK) was added to 210 g of DI water. This mixture then was added to the latex of Examples 1-3 causing thickening of latex without coagulating them. These were designated examples 10-12 respectively, Example 13

High temperature and ionic conductivity of a separator or IES can be improved by adding nano-ceramics to a separator slurry prior to casting. Three parts of example-7, one part of example 9, and 2 part AERODIP W 640 ZX (from EVONIK) were mixed to make the separator slurry.
Separator Forming Evaluation:

The quality of the separator formation was evaluated by preparing both anode and cathode electrodes according to conventional methods of a waterborne slurry as described hereafter.

Waterborne anode slurry composition of Table 1 was cast on copper foil and dried in oven for 15 minutes at 130° C. and then for another 10 minutes at 170° C.

TABLE 1

| Ingredients | Wet (g) | Wet % | Dry (g) | Dry % |
|---|---|---|---|---|
| [1]CMC solution @ 1.35 wt % | 400 | 40.0 | 5.4 | 1.0 |
| Graphite MCMB | 529 | 52.9 | 529 | 97.0 |
| KWB, Example 1 | 36 | 3.6 | 10.8 | 2.0 |
| Water (to adjust viscosity) | 35 | 3.5 | 0.0 | 0.0 |
| Total | 1000 | 100 | 545.2 | 100 |

[1]Aqualon ® CMC-7H3SF (from Ashland)

The waterborne cathode slurry composition of Table 2 was cast on aluminum foil and dried in oven for 15 minutes at 130 C and then for another 10 minutes at 170 C.

TABLE 2

| Ingredients | Wet (g) | Wet % | Dry (g) | Dry % |
|---|---|---|---|---|
| Carbopol 940 (by Lubrizol) in water @ 0.75 wt % | 450 | 43.0% | 3.375 | 0.6% |
| Li OH aqueous solution at 0.2% | 50 | 4.8% | 0.2 | 0.0% |
| Carbon black (Super-P by Timcal) | 10.5 | 1.0% | 10.5 | 2.0% |
| Lithium cobalt oxide | 500 | 47.8% | 500 | 95.3% |
| KWB, Example 1 | 35 | 3.3% | 10.8 | 2.1% |
| Total | 1045.5 | 1.00 | 524.88 | 1.00 |

Either the anode or cathode electrodes was coated with samples of EXAMPLE 7-13 using doctor blades coater. Prior to casting the separator, the porous and dry electrode can be wetted with water or other inert solvents such as alcohol or ether, in order to prevent cracking of separator.

Also, an IES was made by simultaneous or sequential casting a separator onto the wet electrode. As an example, a cathode was cast on aluminum foil (having a dry thickness be 50-70 micron thick) and before drying, the slurry of examples 7-13 were cast on to the wet electrode using a doctor blades coater to produce 10-30 microns thick separator when is dried.

The composite IES was then dried in oven at 170° C. for 15 minutes. The electronic real resistance of solid uniform cast separator on electrode was over 100 k-ohm-cm$^2$. The dry thickness of cast separator was about 10 micron.

Two 2030 coin cells were constructed with the IES anode and cathodes and no conventional separator was used. BASF LP57 (1M LiPF6 in EC/EMC, 50-100 mg charged in each cell) standard electrolyte was used. The cells showed good open circuit voltage and cycling. After 5 cycles of low current formation (C/10), the battery still show expected open circuit voltage.

What is claimed is:

1. An integrated electrode separator assembly comprising at least one anode electrode, and at least one cathode electrode, separated by at least one porous fluoropolymer separator coating layer with no separate separator membrane, said porous fluoropolymer separator coating layer being simultaneously casted with at least one electrode, wherein said porous fluoropolymer separator coating layer comprises discrete fluoropolymer particles and optional powdery inorganic electrochemically stable materials, wherein said fluoropolymer particles are interconnected with said electrodes and said optional powdery inorganic electrochemically stable materials, said discrete fluoropolymer particles having a weight average particle size of less than 500 nm, wherein said fluoropolymer is a high molecular weight fluoropolymer having a melt viscosity of greater than 1.0 kilopoise according to ASTM method D-3835 measured at 450° F. and 100 sec$^{-1}$, and wherein said fluoropolymer comprises a polyvinylidene fluoride homopolymer or copolymer having at least 70 weight percent of vinylidene fluoride units.

2. The integrated electrode separator assembly of claim 1, wherein said porous fluoropolymer separator coating layer is a waterborne coating.

3. The integrated electrode separator assembly of claim 1, wherein said porous fluoropolymer separator coating layer is directly attached to both an anode and a cathode, wherein said porous fluoropolymer separator coating layer on the anode and cathode can be the same or different.

4. The integrated electrode separator assembly of claim 3, wherein the porous fluoropolymer separator coating layers on the anode and cathode are different, with one coating being fluoropolymer-rich, and the other coating being inorganic material-rich.

5. The integrated electrode separator assembly of claim 1, wherein the fluoropolymer particles have a weight average particle size of less than 400 nm.

6. The integrated electrode separator assembly of claim 1, wherein said porous fluoropolymer separator coating layer further comprises powdery inorganic materials that are electrochemically stable.

7. The integrated electrode separator assembly of claim 1, wherein said porous fluoropolymer separator coating layer further comprises one or more additives selected from the group consisting of surfactants, settling agents, wetting agents, thickeners, rheology modifiers, fugative adhesion promoters, fillers, leveling agents, anti-foaming agents, pH buffers.

8. The integrated electrode separator assembly of claim 1, wherein said assembly makes up part of a battery, capacitor, electric double layer capacitor, membrane electrode assembly or fuel cell.

9. The integrated electrode separator assembly of claim 1, wherein said porous fluoropolymer separator coating layer has a dry thickness of 30 microns or less.

* * * * *